United States Patent [19]

Shitanda

[11] Patent Number: 5,710,715
[45] Date of Patent: Jan. 20, 1998

[54] VIBRATION ANALYSIS METHOD

[75] Inventor: Motoshi Shitanda, Toyonaka, Japan

[73] Assignee: Matsushita Electric Industrial Co., Ltd., Osaka-Fu, Japan

[21] Appl. No.: 507,925

[22] Filed: Jul. 27, 1995

[30] Foreign Application Priority Data

Jul. 28, 1994 [JP] Japan .................. 6-176738

[51] Int. Cl.$^6$ .................. G01H 17/00; G01M 19/00; G05B 23/02
[52] U.S. Cl. .................. 364/508; 364/554; 73/658
[58] Field of Search ............... 73/658, 649; 340/870.28; 364/508, 506, 581, 507, 550, 557.01, 554; 342/22, 196

[56] References Cited

U.S. PATENT DOCUMENTS

| | | | |
|---|---|---|---|
| 4,559,828 | 12/1985 | Liszka | 73/658 |
| 4,989,159 | 1/1991 | Liszka et al. | 364/508 |

FOREIGN PATENT DOCUMENTS

| | | | |
|---|---|---|---|
| 05322642 | 12/1993 | Japan | G01H 17/00 |
| 94-013172/02 | 12/1993 | Japan | G01H 17/00 |

*Primary Examiner*—Emanuel T. Voeltz
*Assistant Examiner*—Shah Kaminis
*Attorney, Agent, or Firm*—Wenderoth, Lind & Ponack

[57] ABSTRACT

A vibration analysis method for detecting abnormalities by analyzing a vibration waveform. The method includes the steps of, in a plurality of observation time points $\{t_j\}$ composed of a number n of specified time points $t_j$ ($j=1$ to n) counted from a start time point $t_0$, detecting displacements of a vibration wave $f_j$ ($j=1$ to n) at the individual time points of the plurality of observation time points, and comparing points in an n-dimensional space composed of the displacements, detected at the individual observation time points, with points in the n-dimensional space of a vibration waveform that are designated as being normal.

14 Claims, 4 Drawing Sheets

VIBRATION ANALYSIS METHOD

BACKGROUND OF THE INVENTION

The present invention relates to a vibration analysis method for detecting abnormal vibrations by analyzing vibration waveforms of, for example, sound waves.

The vibration testing of motors or other rotating machinery in manufacturing processes are commonly performed by actually driving the motors. Motors being tested, when driven, generate sound waves of various frequencies. Manufacturing defects or the like, if any, cause the various different sounds that are generated from the motors. Accurately detecting such changes in the sounds result in the detection of defective products.

In general, the detection of abnormalities in motors by the above-described method has conventionally been implemented by organoleptic tests in which the operator listens to the sounds and makes a decision from the sound based on the operator's experience to detect whether or not the motor is abnormal.

Figure 4:
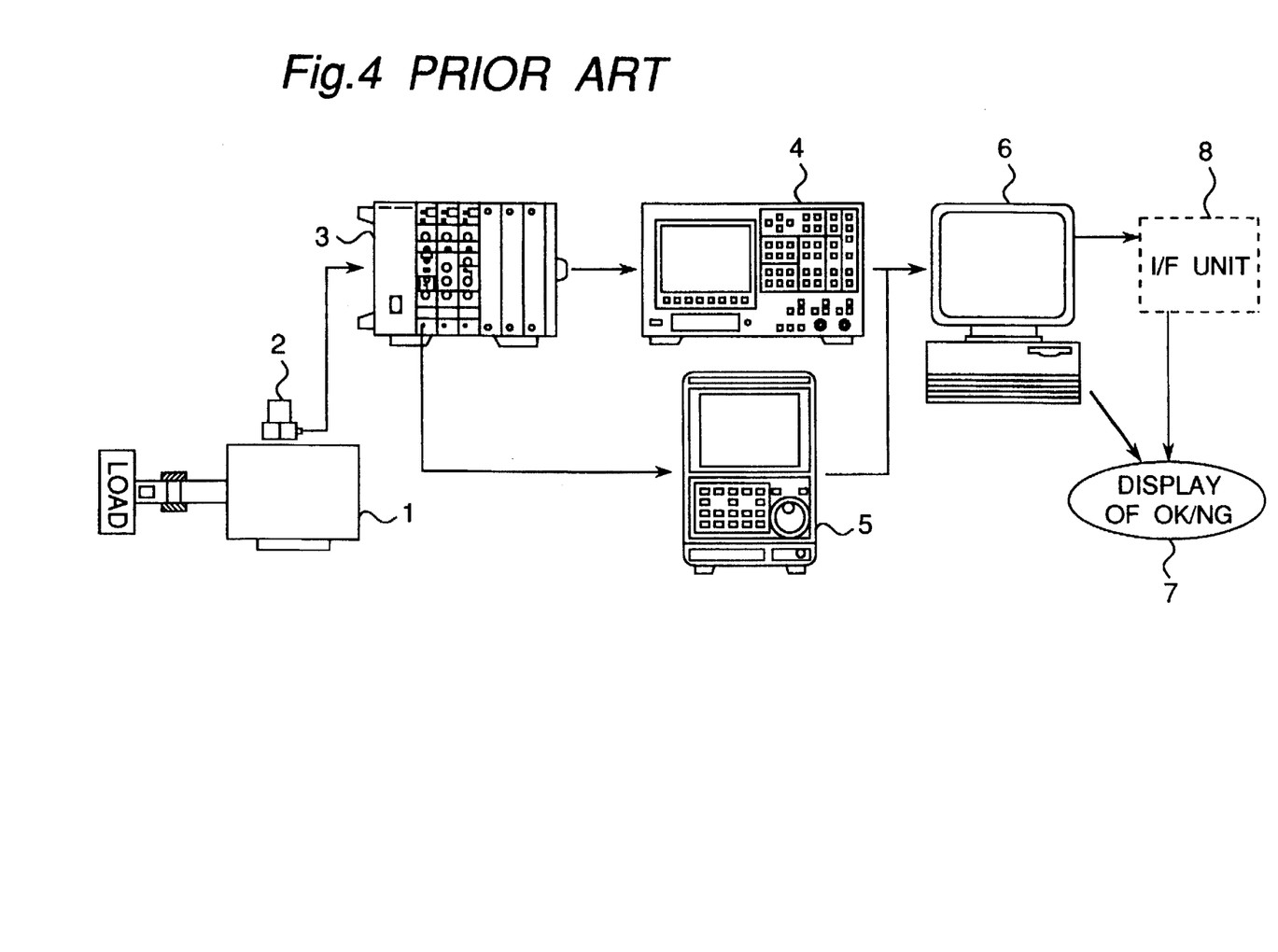
FIG. 4 is a view showing the arrangement of a prior art example.

Attempts have been made to automate this test by using a vibration analyzer. FIG. 4 shows an example of a vibration analyzer. In FIG. 4, shown is a motor 1 to be tested, a microphone 2 for detecting sounds caused by vibration, a signal converter 3, a periodic sound FFT analyzer 4, a continuous sound FFT analyzer 5, a computer 6 for making a testing decision, a display unit 7 for displaying whether the test piece is non-defective or defective, and a processing unit 8 for processing defective products.

Vibration generated by the motor 1 is detected by the microphone 2. The detected vibration is decomposed, by the signal converter 3, into periodic sounds of relatively low frequencies which are indicative of damage to gears or bearings, and continuous sounds of relatively high frequencies which are indicative of eccentricity or brush contact. From these sounds, the continuous sounds of relatively high frequencies are directly Fourier-transformed by the continuous sound FFT analyzer 5 so as to spectrally resolve them into frequency components. The periodic sounds of relatively low frequencies, on the other hand, are transformed into a waveform, by the passage of the sounds through a filter or by envelope detection, and then the resulting waveform is resolved into frequency components by Fourier-transform and spectral resolution in a manner similar to that which was performed for the continuous sounds. The frequency components resolved in this way are inputted to the computer 6, where a waveform analysis is performed by a neural network so that a fuzzy logical OR decision is made based on comparisons of the frequency components detected with frequency components of normal vibrations or on results obtained from a plurality of viewpoints such as crutosis and overall values. Results of the decision are displayed on the display unit 7, where any defect, if found, is processed by the defective product processing unit 8.

In this vibration analyzer using a neural network, even a waveform, which has been determined by the vibration analyzer to be abnormal in spite of actually being normal, can be registered and identified as being normal, so that similar waveforms, if detected in succeeding decisions, can be recognized as actually being normal. Also, the use of the fuzzy logical OR operation allows the test to closely resemble an organoleptic test.

The above vibration analyzer can also be used for monitoring other types of equipment that generate sounds during operation. In monitoring a boiler, for example, the above vibration analyzer can be used in an arrangement such that a microphone 2 is installed a predetermined distance away from the boiler, a device that warns the operator of an abnormal detection is provided instead of the decision display unit 7, and an emergency stop device is provided instead of the defective product processing unit 8.

In this vibration analyzer used for monitoring a boiler, sounds generated by the boiler are detected by the microphone 2 at regular time intervals, and a waveform analysis is performed by resolving the sounds into frequency components in a manner similar to the foregoing test of motors. If an abnormality is detected, the operator is warned and the boiler is emergency stopped.

For the testing processes involved in the manufacture of rotating machinery such as motors, the organoleptic tests performed by operators has a disadvantage in that poorly experienced operators cannot successfully carry out the test.

Also, even with the use of the above vibration analyzer, the decision of abnormality is dependent on the frequency analysis of vibrations, thus making it difficult to determine, if features cannot be extracted by frequency analysis, whether a small but abnormal vibration, that has taken place in a frequency region between two frequencies each having a peak, is an abnormal vibration or only a shift of a vibration having peaks on both sides. This leads to a disadvantage in that abnormalities which do not exhibit noticeable features, such as those which have peaks as a result of the frequency analysis, could not be detected. Another disadvantage is that in order for the vibration analysis to be performed at a higher accuracy, it takes a longer amount of time for abnormality decisions to be made because a detailed frequency analysis and a complex decision makeup are involved.

As a further disadvantage, the operator needs to be well experienced to grasp correct waveform features, which would require the operator to undergo trial and error procedures repetitively. Moreover, the prior art vibration analysis method involves performing steps of inputting correct waveforms to teach their features to the analyzer, thus requiring increased labor and time. In particular, when the prior art vibration analysis method is used in the testing processes of different products, more labor and time must be spent for every change in the type of product to be tested.

SUMMARY OF THE INVENTION

An object of the present invention, as a result of the foregoing, is to provide a vibration analysis method which may solve the above-described disadvantages and which has a simpler decision procedure which is enabled by observing unique characteristics of vibration waveforms.

In accomplishing these and other objectives, according to one aspect of the present invention, there is provided a vibration analysis method for detecting abnormalities by analyzing a vibration waveform, comprising the steps of, in a plurality of observation time points $\{t_j\}$ composed of a specified number n of time points $t_j$ (j=1 to n) counted from a start time point $t_o$, detecting displacements of a vibration wave $f_j$ (j=1 to n) at the individual time points of the plurality of observation time points, and comparing points in an n-dimensional space composed of the displacements, detected at the individual observation time points, with points in the n-dimensional space of a vibration waveform that are designated as being normal.

According to another aspect of the present invention, there is provided the vibration analysis method further comprising a step of, if a result of the comparison falls outside a specified allowable range, determining that the detected point is abnormal.

Vibration waveforms have a quantity unique to the individual types of waveforms. This quantity is determined by observing a displacement of a wave at a given time point, and comparing it with a preset quantity of a waveform that is designated as being normal. If the determined quantity falls outside a specified range, then the waveform is decided to be abnormal. As a result, the method involves only a simple comparison of numerical values, thus resulting in simple calculations, reduced processing time, and no need for trial and error procedures to be performed.

The aforementioned quantity which is unique to waveforms is a parameter which shows a particular region within an n-dimensional space formed of displacements detected at preset n observation time points. Also, a displacement of vibration detected at each observation time point can be denoted by one point in the n-dimensional space. Accordingly, a waveform can be determined to be normal when it falls within a range of allowable values in a particular region characterized by the quantities unique to waveforms designated as being normal in the n-dimensional space formed of detected displacements. Meanwhile, a waveform is determined to be abnormal when it falls outside of the range of allowable values.

The quantity that is unique to waveforms and yet allows for an easy detection of abnormalities is explained below.

Assuming that k is 0 or a positive integer, an m-function system $\{\zeta_k(t)\}$ (k=0 to m−1) that is integrable over a specified range $t_0 < t < t_0 + \Omega$ is now considered. In this case, $\{\zeta_k(t)\}$ is assumed to have an orthonormal relation of Eq. 3:

$$\int_{t_0}^{t_0+\Omega} \zeta_k(t)\zeta_j(t)dt = \begin{cases} 1 & k=j \\ 0 & k \neq j \end{cases} \quad \text{Eq. 3}$$

It is known that an arbitrary function $f(t)$ integrable within the range of $t_0 < t < t_0 + \Omega$ can be developed in approximation as a linear combination of the function system $\{\zeta_k(t)\}$ as shown by Eq. 4:

$$f(t) = \sum_{k=0}^{m-1} a_k \zeta_k(t) \quad \text{Eq. 4}$$

where $a_k$ is a coefficient that depends on the function $f(t)$ and which can be determined by Eq. 5:

$$a_k = \int_{t_0}^{t_0+\Omega} f(t)\zeta_k(t)dt \quad \text{Eq. 5}$$

In other words, the function $f(t)$ can be expressed as vectors of $(a_0, \ldots, a_{m-1})$ in the Hilbert space with the function system $\{\zeta_k(t)\}$ taken as the basis. Now assuming that the function $f(t)$ represents a physical event such as a vibration, Eq. 4 shows that the function $f(t)$ has a superposition of states represented by the basis $\{\zeta_k(t)\}$ at a magnitude of $a_k$. For example, if the function $f(t)$ represents a vibration and is a trigonometric function representing a frequency characterized by k with the basis $\{\zeta_k(t)\}$, then each coefficient $a_k$ represents the amplitude of a vibration component $\zeta_k(t)$ in the vibration $f(t)$. It is appropriate to analyze the function $f(t)$ with a Hilbert space characterized by a specified basis $\{\zeta_k(t)\}$ according to the feature of the function $f(t)$. For example, if $f(t)$ represents a vibration of a sound wave, then a trigonometric function is appropriately adopted as the basis since the vibration of sound waves is a superposition of vibrations of several frequencies. A vibration is generally a superposition of several vibrations, and thus, the Bessel function may also be set as the basis for vibrations of a free electron laser or the like.

Conventional spectral analysis of vibrations have been carried out with a limitation to the Hilbert space taking merely a trigonometric function as the basis function. As a result, the conventional method could analyze those vibrations having characteristic features in the Hilbert space, so that it could detect only abnormalities having characteristic features in the Hilbert space. Further, the conventional method would take a long amount of time for calculation, since the integration by Eq. 5 would be executed for every k.

Although the above method is applicable to general physical phenomena, it is assumed, for a more concrete explanation hereinafter, that the function $f(t)$ represents a vibration function.

In order to analyze a physical phenomenon in which the principle of superposition exists, like vibrations for example, it is common to consider a quantity $\alpha$ obtained by integrating the result of multiplying the vibration function $f(t)$, which is the object of analysis, by a time function $\psi(t)$, which shows the physical phenomenon to be observed, as shown in Eq. 6:

$$\alpha = \int_{t_0}^{t_n} f(t)\psi(t)dt \quad \text{Eq. 6}$$

This $\alpha$ denotes an inner product within the Hilbert space of the vibration function $f(t)$, which is the analysis object, and the function $\psi(t)$ represents the physical phenomenon to be observed. If the inner product is 0, then it follows that $f(t)$ has no component in the direction of $\psi(t)$, i.e. the vibration represented by $f(t)$ is absolutely independent of the phenomenon represented by $\psi(t)$, and that the phenomenon represented by $\psi(t)$ is not observed. Therefore, $\alpha$ represents the degree of state represented by function $\psi(t)$ in $f(t)$. For example, Eq. 5 shows that the basis function $\zeta_k(t)$ is adopted as the $\psi(t)$ of Eq. 6, and the integrated quantity $a_k$ shows the degree of a state represented by $\zeta_k(t)$, where if $a_k$ is 0, then it shows that the vibration represented by $f(t)$ does not contain the state at all. Similarly, if the integration is carried out by adopting cos(kt) as $\psi(t)$, then the amplitude of a vibration having a frequency of $2\pi/k$ contained in the vibration can be obtained. Similarly, if the integration is carried out by multiplying the function $f(t)$ to be analyzed by a damping function exp(−kt), having a specified damping coefficient k as $\psi(t)$, then it can be determined whether or not the vibration has been damped.

The $\alpha$ is a quantity determined by integration without a resolution by the basis system of the Hilbert space, and therefore, it is independent from the adoption of the basis function system of the Hilbert space. In the prior art, a function representing vibrations of particular frequencies is adopted as the basis function system and the vibration analysis would be performed with only the Hilbert space of this basis function system so that the physical quantity to be measured depends largely on the frequency of the basis function system. This makes it difficult to account for variations in frequency, for example, in the analysis of state transition processes. On the other hand, the present invention calculates the quantity independent from the adoption of the basis function system, and therefore the method of the present invention is effective also to cases where the reference frequency varies with time.

A discrete approximation of integration by using amplitudes $f_j = f(t)$ at a finite number n of observation time points $t_j$ (j=1 to n) in the aforementioned integration results in Eq. 7:

$$\alpha = \sum_{j=1}^{n-1} \frac{\xi_+ t_{j+1} + \xi_0 t_j + \xi_- t_{j-1}}{t_n - t_0} f_j \psi(t_j) \qquad \text{Eq. 7}$$

where $\xi_+$, $\xi_0$, $\xi_-$ are coefficients of finite difference that satisfy an equation $\xi_+ + \xi_0 + \xi_- = 0$. For example, if $\xi_+ = 1$, $\xi_0 = 0$, and $\xi_- = -1$, then the result will be a central difference, whereas if $\xi_+ = 1$, $\xi_0 = -1$, and $\xi_- = 0$, then the result will be a forward difference. Otherwise available are finite differences such that $\xi_+ = 0.75$, $\xi_0 = -0.5$, and $\xi_- = -0.25$. The $\alpha$ calculated by this equation is a total sum of the products of values of observations and functions representing a phenomenon, and therefore the equation can be calculated without determining each component $a_k$ of the Hilbert space. Thus, the $\alpha$ is a value that can be calculated in a short amount of time.

However, if $\alpha$ is targeted for evaluation as described, conditions required for the test to be correctly performed are severely restricted. For example, the amplitude would be required to remain constant because of the amplitude of the whole vibration $f(t)$, which is the object of analysis, and because of the arbitrariness of the function $\psi(t)$ which is a multiple of a constant. Therefore, cosine $\beta$ of an angle $\theta$ formed in the Hilbert space by the two functions of the vibration $f(t)$, which is the object of analysis, and the function $\psi(t)$ of the physical phenomenon to be observed is calculated from Eq. 8:

$$\cos\theta = \beta$$

$$\beta = \frac{\sum_{j=1}^{n-1} \frac{\xi_+ t_{j+1} + \xi_0 t_j + \xi_- t_{j-1}}{t_n - t_0} f_j \psi(t_j)}{\sqrt{\sum_{j=1}^{n-1} \left\{ \frac{\xi_+ t_{j+1} + \xi_0 t_j + \xi_- t_{j-1}}{t_n - t_0} f_j \right\}^2} \sqrt{\sum_{j=1}^{n-1} \left\{ \frac{\xi_+ t_{j+1} + \xi_0 t_j + \xi_- t_{j-1}}{t_n - t_0} \psi(t_j) \right\}^2}} \qquad \text{Eq. 8}$$

and the result is taken as the target of evaluation, where the denominator of Eq. 8 is the result of approximating Eq. 9:

$$\int_{t_0}^{t_n} f(t)^2 dt \int_{t_0}^{t_n} \psi(t)^2 dt \qquad \text{Eq. 9}$$

by using the amplitudes $f_j = f(t_j)$ at a finite number n of observation time points $t_j$ (j=1 to n) as in Eq. 7. If the cosine $\beta$ by the above Eq. 8 is adopted, the amplitude of the whole $f(t)$ and the arbitrariness of the function $\psi(t)$, being a multiple of a constant, can be eliminated so that the degree of $\psi(t)$ contained in $f(t)$ can be described quantitatively. Accordingly, even in applications of the present invention to the analysis of sound waves, the scope of application can be widened without depending on the distance of the sound wave pickup position from the sound source. $\psi(t)$ is usually taken as a damping function in the analysis of damping or the like, whereas $\alpha$ cannot be evaluated always in the same way by the damping coefficient contained in the damping function. However, using the cosine $\beta$ of Eq. 8 allows a damping even with an arbitrary damping coefficient to be evaluated always in the same way.

A function $\psi(t)$ representing a characteristic physical phenomenon such as a damping or the vibration of a particular frequency is specifically determined with respect to a vibration to be analyzed, and then, with regard to the specified function $\psi(t)$, $\alpha$ or $\beta$ is previously measured for a vibration that is designated as being normal. The measured $\alpha$ and $\beta$ are designated $\alpha_0$ or $\beta_0$, respectively. On the other hand, $\alpha$ or $\beta$ is measured for a vibration to be observed, and compared with $\alpha_0$ or $\beta_0$, respectively. Thus, an observed waveform can be compared with a normal waveform in which, if the waveform results in a difference which is more than a defined amount, the vibration can be decided to be abnormal.

In the n-dimensional space composed of displacements at observation points, points ($\psi(t_0), \psi(t_1), \ldots, \psi(t_n)$) resulting from values of the function representing a physical phenomenon at observation time points by the n-dimensional space are denoted by $\psi$. With the use of the above $\alpha$, a region is designated which is vertical to a line directed from the origin toward $\psi$ and which has a distance of $\alpha$ from the origin, within the n-dimensional space. Therefore, the allowable range with the use of the above $\alpha$ refers to a range within a specified distance from this region. Actually, since the detection of abnormalities using $\alpha$ requires that the amplitude of a vibration to be observed be maintained constant, the range is further restricted. Also, with the use of the above $\beta$, a region is designated which forms a certain angle $\theta$ with a line that connects the origin to $\psi$ within the n-dimensional space. Therefore, the allowable range, using the $\beta$ means, falls in this range within an allowable error range. If n=3, then the designation of the allowable range using $\alpha$ refers to a range that is distant from the origin by $\alpha$ and that is distant by a range of allowable values from a plane vertical to the line connecting the origin to $\psi$. Actually, since the amplitude of a vibration to be observed must be kept constant, the range that meets the requirement that $\alpha$ be constant falls upon a circumference within the plane, and a region with allowable values added thereto becomes a side face of a truncated cone. Further, if n=3, then the region in which $\beta$ is constant is a conical face taking the origin as a vertex and having a vertical angle $\theta$ about an axis of the line that connects the origin to $\psi$, where the side face of the truncated cone, which is the allowable range using $\alpha$, is part of the conical face. Therefore, the detection of abnormalities using $\beta$ is achieved by taking the conical face as a reference and by deciding whether or not an observation point is present on the conical face having a vertical angle of the allowable range.

Further, in order to perform both, analysis of low frequencies and analysis of high frequencies, if a plurality of observation time points with longer intervals between adjacent observation time points is provided for use of low frequencies, while a plurality of observation time points with shorter intervals between adjacent observation time points is provided for use of high frequencies, and if the analysis is carried out with each of the observation time points, then the characteristics of each of the frequency regions can be detected. Also, it is preferable to provide a plurality of observation time points corresponding to a phenomenon to be observed.

The above-described method may be applied to almost all the cases in which vibrations are analyzed, such as tests for rotating machinery or the monitoring of heat exchangers of boilers and nuclear reactors that generate sounds during operation.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Embodiments of the present invention are now described with reference to the accompanying drawings.

Figure 1:
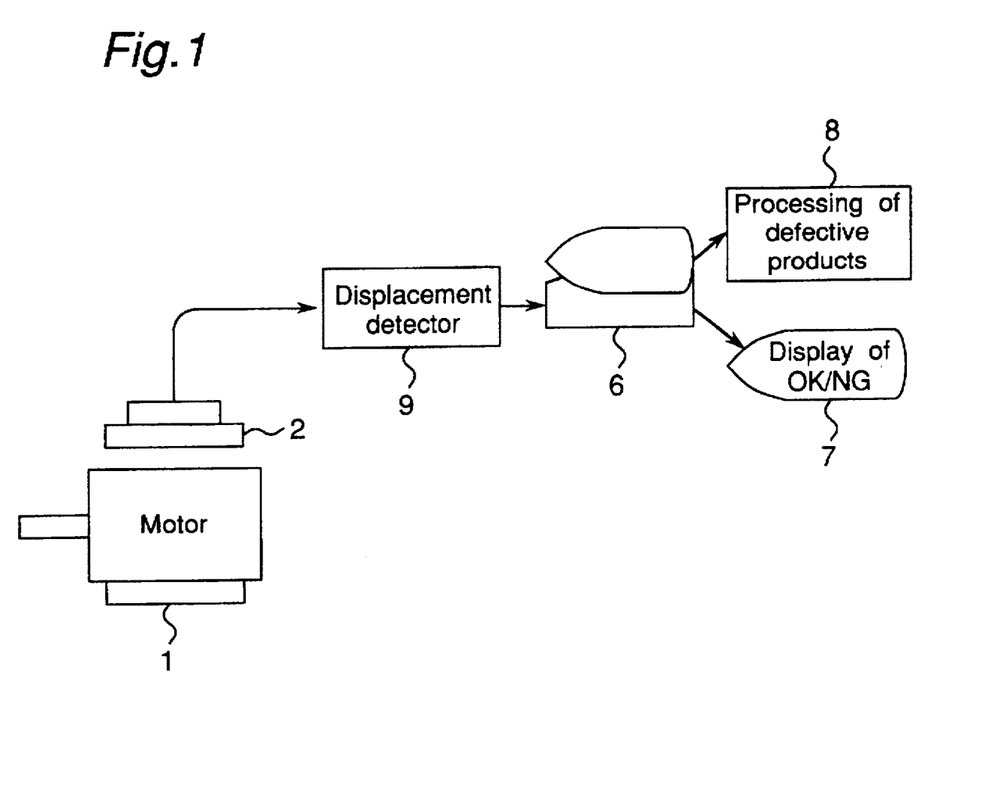
FIG. 1 is a view showing the arrangement of an embodiment of the present invention.

FIG. 1 is a view showing the arrangement of motor test equipment for an embodiment of the present invention. In FIG. 1, there is shown a motor 1 which is a test object, a microphone 2 for detecting vibration sounds, a displacement detector 9 for detecting a displacement at each observation time point of a vibration wave, a computer 6 for making determinations and decisions, a display unit 7 for displaying whether the test object is non-defective or defective, and a processing unit 8 for processing defective products.

Figure 2A:
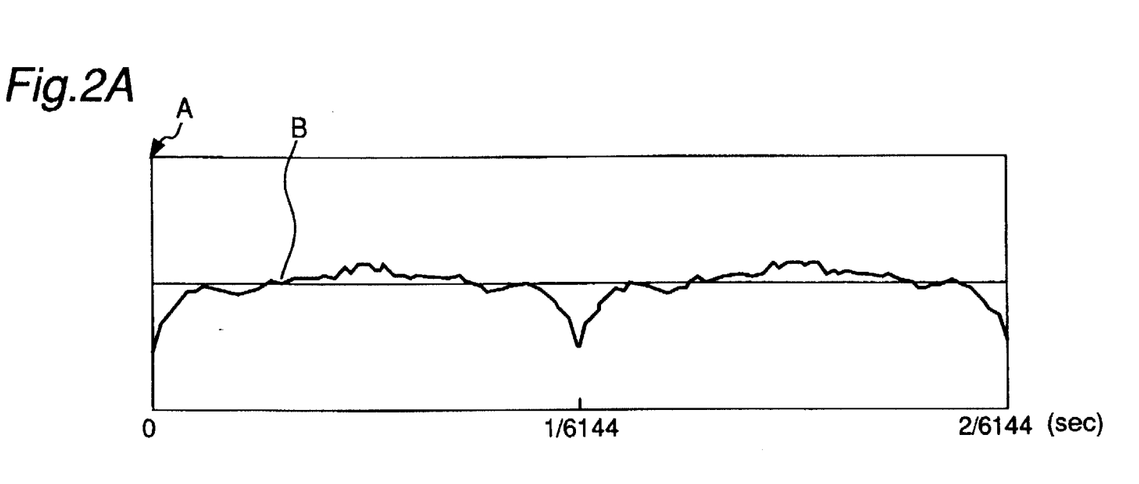
FIGS. 2A and 2B are views showing waveforms of normal waves in which the ordinate axis is a dimensionless wave magnitude which is obtained by dividing the respective amplitude by a maximum amplitude.
Figure 2B:
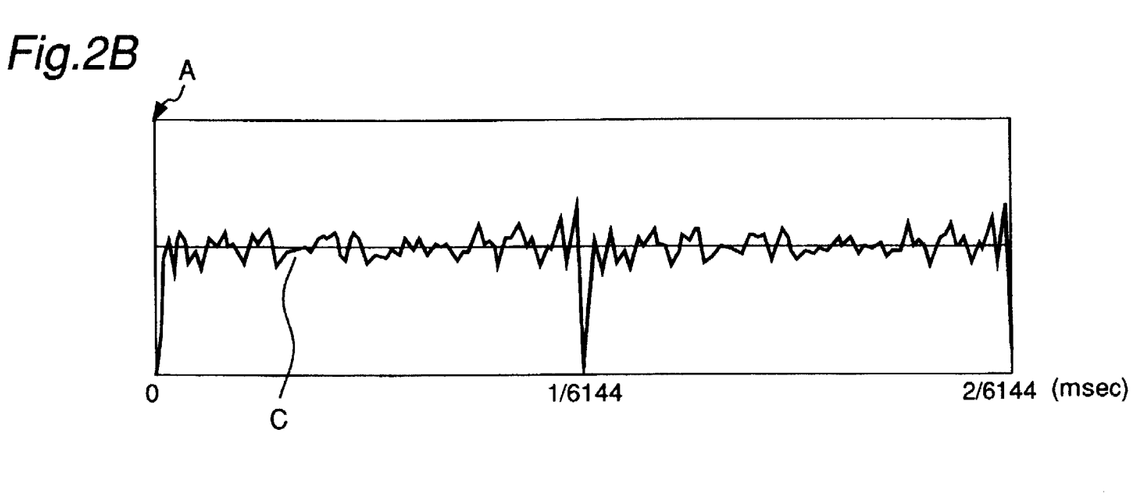

A vibration generated from the motor 1 is detected by the microphone 2. The detected vibration is binarized by the displacement detector 9 and is inputted to the computer 6. The computer 6 has previously stored therein a number of revolutions per second P of the motor 1 and a number of times of data extraction n for analysis, where a plurality of observation time points are set at time intervals of $1/(nP)$ seconds for analysis of low frequencies and at time intervals of $1/(1000\ nP)$ seconds for analysis of high frequencies. That is, $t_i = i/(nP)$ is set for analysis of low frequencies while $t_i = i/(1000\ nP)$ is set for analysis of high frequencies. The displacement $f_i$ is detected for each of the observation time points, and the resulting displacement $f_i$ and $t_i$ are substituted into Eq. 10:

FIGS. 2A and 2B show examples of a wave that is observed to be normal, where FIG. 2A shows a low frequency portion of the wave taken as normal, while FIG. 2B shows a high frequency portion of the wave taken as normal. For the low frequency portion of the wave, 1024 observation points were provided at intervals of 1/6144 seconds, starting at a point A, and $\psi(t)$ is set by Eq. 11 for $k=2\pi$:z $$\psi(t) = \cos\left( k \frac{t}{t_n - t_0} \right)$$ Eq. 11

Then, the value of $\beta_0$ is calculated by Eq. 10, resulting in a value of 0.1593. With this value adopted as the normal value, and with an allowable error or 0.01 provided for this normal value, the test of motors is carried out. Similarly, 1024 observation points are provided at intervals of 1/6144 milliseconds for the high frequency portion, and $\psi(t)$ is set by Eq. 11 for k=0. Then, the value of $\beta_0$ is calculated by Eq. 10, resulting in a value of 0.20034. As in the case of the low frequency portion, with this value adopted as the normal value and with an allowable error of 0.01 provided for this normal value, the test of motors is carried out.

Figures 3A, 3B:
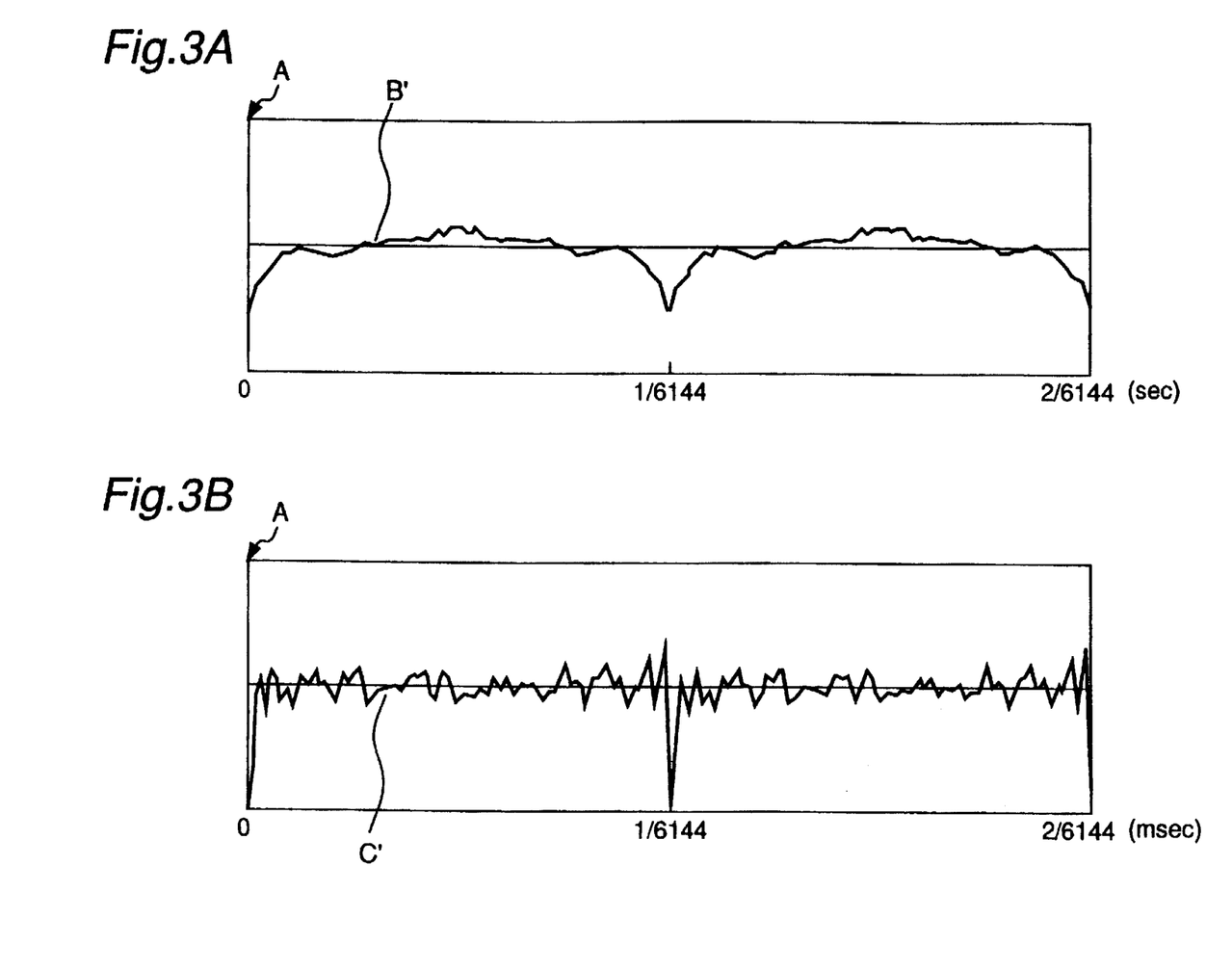
FIGS. 3A and 3B are views showing waveforms of abnormal waves in which the ordinate axis is a dimensionless wave magnitude which is obtained by dividing the respective amplitude by a maximum amplitude.

FIGS. 3A and 3B show examples of a wave that is observed to be abnormal, where FIG. 3A shows a low frequency portion of the wave while FIG. 3B shows a high frequency portion of the wave. There are differences in waveform, although small, between points B of FIG. 2A and B' of FIG. 3A for the low frequency portion, and between points C of FIG. 2B and C' of FIG. 3B for the high frequency portion. The fundamental frequency is 60 Hz in a vibration of the same frequency as the number of revolutions per second of the motor. The value of $\beta$ for k=1 in this waveform is 0.1702, thus resulting in a large difference in value, although the waveforms are of visible resemblance. Also for the high frequency portion, $\beta$ is 0.19030 for k=0. Like this, waveforms that are decided to be abnormal can be observed only by simple comparison.

Although $k=2\pi$ for the low frequencies and k=0 for the high frequencies have been adopted in this embodiment, other values of k may also be adopted. For example, if a value resulting from multiplying by $2\pi$ the value of a ratio of the radius of the ball of a bearing to the radius of the rotating shaft supported by the bearing is adopted as k, then it becomes possible to detect any damage of the bearing.

This value of k remains unchanged even if the point A is set to any arbitrary position since the value of k is independent. Also, even if the value of the number of observation points "n" is set to be 1024 or more and even if the time $$\beta = \frac{\sum_{j=1}^{n-1} \frac{\xi_+ t_{j+1} + \xi_0 t_j + \xi_- t_{j-1}}{t_n - t_0} f_j \psi(t_j)}{\sqrt{\sum_{j=1}^{n-1} \left\{ \frac{\xi_+ t_{j+1} + \xi_0 t_j + \xi_- t_{j-1}}{t_n - t_0} f_j \right\}^2} \sqrt{\sum_{j=1}^{n-1} \left\{ \frac{\xi_+ t_{j+1} + \xi_0 t_j + \xi_- t_{j-1}}{t_n - t_0} \psi(t_j) \right\}^2}}$$ Eq. 10 whereby $\beta$ is determined. It is noted that the central difference is used as one example in this embodiment, where values of $\xi_+ = 1$, $\xi_0 = 0$, and $\xi_- = -1$ are adopted. The resulting value of $\beta$ is compared with the value of $\beta_0$ calculated by Eq. 10 with respect to a wave that is assumed or designated to be normal. If it is within the allowable range determined by operator's experience, the motor 1 is decided to be non-defective. If it is outside the allowable range, the motor 1 is decided to be defective. This result is displayed on the display unit 7, where, if a defective product is found, it is processed by the defective product processing unit 8. For example, the defective product is taken out from a manufacturing line of the motors.

interval is changed according to this number of observation points "n," the value of k remains unchanged.

If the fundamental frequency is different, it is preferable that the time interval is properly changed without changing the number of observation points "n." Further, although it has been assumed in this embodiment that sounds due to brush contact or the like are generated 1000 times per rotation, i.e., 6000 Hz or so, the time interval for this high frequency may also be changed according to the characteristics of the motor. It is also allowable to set the observation points to characteristic points at the time of observation according to the characteristics of the wave to be observed without making the time intervals constant. For example, for analysis of a damping vibration, it is effective to set the initial-stage time intervals to be shorter and the last-stage time intervals to be longer. While equal time intervals would not require attention to be paid to $\xi_+$, $\xi_0$, and $\xi_1$, it is necessary to pay attention to them when non-constant time intervals are involved. A central difference with $\xi_+=1$, $\xi_0=0$, and $\xi_-=-1$ is appropriate in general, but a forward difference with $\xi_+=1$, $\xi_0=-1$, and $\xi_-=0$, a backward difference with $\xi_+=0$, $\xi_0=1$, and $\xi_1=-1$, and a difference intermediate between the forward difference and the central difference with $\xi_+=0.75$, $\xi_0=-0.5$, and $\xi_-=-0.25$ are available as well.

The above description has been made with respect to the motor test equipment, however, the present invention may also be applied as monitoring equipment for boilers during their operation. A second embodiment of the present invention is described below as an application example thereof.

The arrangement of the equipment is similar to FIG. 1, which is the arrangement of the foregoing embodiment, except that an alarm device for the operator is provided instead of the decision display unit 7 and an emergency stop device is provided instead of the defective product processing unit. A microphone 2 is installed at a position a predetermined distance away from the boiler.

Sounds of the boiler are observed at regular time intervals, and waveforms are analyzed in the same method as in the foregoing, whereby β is determined. A computer 6 has stored $\beta_0$ which is previously determined by analysis with respect to a waveform that is assumed to be normal. The computer 6 compares an observed value of β with the stored normal value $\beta_0$, and if the value of β is within an allowable range determined by the operator's experience, the computer 6 decides it to be normal. If it is outside the allowable range, the computer 6 alarms the operator by the alarm device, and if it deviates from the allowable range to a large extent, the computer 6 decides that the boiler is experiencing serious trouble, bringing the boiler into an emergency stop. The boiler sound can be observed sufficiently by an interval period of 1 minute or so. Also, in order to exclude sounds caused by sound sources other than the boiler, such as the passage of a cart nearby the microphone, an alarm is issued when abnormalities are detected during predetermined intervals. Further, abnormalities can be detected more correctly by arranging the microphones 2 at a plurality of positions, analyzing vibrations for each piece of data independently, and alarming the operator when even one abnormality has been detected. In addition, using β allows abnormalities to be detected independently of the magnitude of sounds that depend on the distance of the microphone from the boiler.

In a similar manner, the present invention may also be applied to monitor the vibrations of heat exchangers of nuclear reactors. The equipment arrangement is also the same as in the second embodiment, except that a sensor for observing plasma density or the like is used instead of the microphone 2, and that an alarm device for the operator is provided instead of the decision display unit 7 of the first embodiment. Further, decisions for emergency stops are made comprehensively from the temperature in the heat exchanger and other conditions. The calculation of β is performed in the same way as in the second embodiment.

According to the present invention, accurate vibration analysis can be accomplished in a short amount of time with a simple decision makeup.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. A vibration analysis method for detecting abnormalities by analyzing a vibration waveform, said method comprising the steps of:

detecting displacements of a vibration waveform $f_j$ (j=1 to n) at a set of observation time points $\{t_j\}$, wherein the set of observation time points $\{t_j\}$ are of a specified number n wherein $t_j$ (j=1 to n) with a start time point of $t_0$;

calculating α which is a characteristic quantity of the vibration waveform by substituting ψ(t), which is a function of time t and is descriptive of a specified phenomena, into a following equation with $\xi_+$, $\xi_0$, and $\xi_-$ being values such that $\xi_+ + \xi_0 + \xi_- = 0$:

$$\alpha = \sum_{j=1}^{n-1} \frac{\xi_+ t_{j+1} + \xi_0 t_j + \xi_- t_{j-1}}{t_n - t_0} f_j \psi(t_j)$$

where $\psi(t_j)$ is a function of time $t_j$;

limiting an allowable range in the n-dimensional space based upon α;

comparing points in an n-dimensional space of the displacements detected at the set of observation time points at said detecting step with points in the n-dimensional space of a vibration waveform that is designated as being normal; and determining whether points in the n-dimensional space compared at said comparing step are abnormal, wherein a point is determined to be abnormal when the comparison falls outside the allowable range.

2. The vibration analysis method of claim 1, further comprising the step of displaying the results of said determining step.

3. The vibration analysis method of claim 1, wherein ψ(t) is defined by the following equation with k being a real number:

$$\psi(t) = \cos\left( k \frac{t}{t_n - t_0} \right).$$

4. The vibration analysis method of claim 3, further comprising the steps of:

providing a plurality of sets of the observation time points;

setting the real number k with respect to each of the sets of observation time points; and performing said detecting, calculating, limiting, comparing, and determining steps for the plurality of sets of the observation time points.

5. The vibration analysis method of claim 1, wherein ψ(t) is defined by the following equation with k being a real number:

$$\psi(t) = \exp(-kt).$$

6. The vibration analysis method of claim 5, further comprising the steps of:

providing a plurality of sets of the observation time points;

setting the real number k with respect to each of the sets of observation time points; and performing said detecting, calculating, limiting, comparing, and determining steps for the plurality of sets of the observation time points.

7. The vibration analysis method of claim 1, further comprising the steps of:
   providing a plurality of sets of the observation time points;
   setting the function $\psi(t)$ with respect to the plurality of the sets of the observation time points; and
   performing said detecting, calculating, limiting, comparing, and determining steps for the plurality of sets of the observation time points.

8. A vibration analysis method for detecting abnormalities by analyzing a vibration waveform, said method comprising the steps of:
   detecting displacements of a vibration waveform $f_j$ (j=1 to n) at a set of observation time points $\{t_j\}$, wherein the set of observation time points $\{t_j\}$ are of a specified number n wherein $t_j$ (j=1 to n) with a start time point of $t_0$;
   calculating $\beta$ which is a characteristic quantity of the vibration waveform by substituting $\psi(t)$, which is a function of time t and is descriptive of a specified phenomena, into a following equation with $\xi_+$, $\xi_0$, and $\xi_-$ being values such that $\xi_+ + \xi_0 + \xi_- = 0$:

$$\beta = \frac{\sum_{j=1}^{n-1} \frac{\xi_+ t_{j+1} + \xi_0 t_j + \xi_- t_{j-1}}{t_n - t_0} f_j \psi(t_j)}{\sqrt{\sum_{j=1}^{n-1} \left\{ \frac{\xi_+ t_{j+1} + \xi_0 t_j + \xi_- t_{j-1}}{t_n - t_0} f_j \right\}^2} \sqrt{\sum_{j=1}^{n-1} \left\{ \frac{\xi_+ t_{j+1} + \xi_0 t_j + \xi_- t_{j-1}}{t_n - t_0} \psi(t_j) \right\}^2}}$$

where $\psi(t_j)$ is a function of time $t_j$;
   limiting an allowable range in the n-dimensional space based upon $\beta$;
   comparing points in an n-dimensional space of the displacements detected at the set of observation time points at said detecting step with points in the n-dimensional space of a vibration waveform that is designated as being normal; and
   determining whether points in the n-dimensional space compared at said comparing step are abnormal, wherein a point is determined to be abnormal when the comparison falls outside the allowable range.

9. The vibration analysis method of claim 8, further comprising the step of displaying the results of said determining step.

10. The vibration analysis method of claim 8, wherein $\psi(t)$ is defined by the following equation with k being a real number:

$$\psi(t) = \cos\left(k \frac{t}{t_n - t_0}\right).$$

11. The vibration analysis method of claim 10, further comprising the steps of:
   providing a plurality of sets of the observation time points;
   setting the real number k with respect to each of the sets of observation time points; and
   performing said detecting, calculating, limiting, comparing, and determining steps for the plurality of sets of the observation time points.

12. The vibration analysis method of claim 8, wherein $\psi(t)$ is defined by the following equation with k being a real number:

$$\psi(t) = \exp(-kt).$$

13. The vibration analysis method of claim 12, further comprising the steps of:
   providing a plurality of sets of the observation time points;
   setting the real number k with respect to each of the sets of observation time points; and
   performing said detecting, calculating, limiting, comparing, and determining steps for the plurality of sets of the observation time points.

14. The vibration analysis method of claim 8, further comprising the steps of:
   providing a plurality of sets of the observation time points;
   setting the time function $\psi(t)$ with respect to the plurality of sets of the observation time points; and
   performing said detecting, calculating, limiting, comparing, and determining steps for the plurality of sets of the observation time points.

* * * * *